United States Patent
Yamamoto et al.

(10) Patent No.: US 6,627,714 B2
(45) Date of Patent: Sep. 30, 2003

(54) METHOD FOR PRODUCING AN OLEFIN TYPE COPOLYMER HAVING A CYCLIC STRUCTURE

(75) Inventors: Shigeharu Yamamoto, Chiba (JP); Sakae Kamiyama, Chiba (JP); Toshifumi Takemori, Chiba (JP); Yoji Suzuki, Chiba (JP); Kazuhiko Mizuno, Chiba (JP); Yoko Furuyama, Chiba (JP); Hiroshi Yamazaki, Saitama (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 52 days.

(21) Appl. No.: 09/985,488

(22) Filed: Nov. 5, 2001

(65) Prior Publication Data

US 2002/0058767 A1 May 16, 2002

(30) Foreign Application Priority Data

Nov. 10, 2000 (JP) ........................................ 2000-343540

(51) Int. Cl.$^7$ .......................... C08F 4/44; C08F 136/02; C08F 236/02
(52) U.S. Cl. .................. 526/160; 526/129; 526/281; 526/282; 526/283; 526/336; 526/905; 526/916; 526/348.6; 502/152
(58) Field of Search ................ 526/160, 282, 526/281, 283, 336, 348.6, 916, 905, 129; 502/152

(56) References Cited

U.S. PATENT DOCUMENTS

| | | |
|---|---|---|
| 5,087,677 A | 2/1992 | Brekner et al. |
| 5,552,489 A * | 9/1996 | Merrill et al. ............... 525/210 |
| 6,316,560 B1 * | 11/2001 | Jacobs et al. ............... 526/160 |

FOREIGN PATENT DOCUMENTS

WO  WO 97/20872  6/1997

OTHER PUBLICATIONS

Walter Kaminsky, et al., Makromolekulare Chemie, vol. 190, No. 3, pp. 515–526, XP–000127629, "Copolymerization of Cycloalkenes With Ethylene in Presence of Chiral Zirconocene Catalysts", Mar. 1, 1989.

* cited by examiner

*Primary Examiner*—Robert Harlan
(74) *Attorney, Agent, or Firm*—Oblon, Spivak, McClelland, Maier & Neustadt, P.C.

(57) ABSTRACT

An olefinic copolymer having a cyclic structure is prepared by copolymerizing a) ethylene (M1) and b) dicyclopentadiene or tricyclopentadiene (M2), and, optionally c) a cyclic olefin (M3), in the presence of a catalyst which contains a metallocene compound (A) having formula [1]: $H_2C(R'_mCp)(R''_nCp)MX_2$[1], wherein M is zirconium or hafnium, Cp has a cyclopentadienyl skeleton, each of R' and R" is a hydrocarbon group having 1 to 10 carbon atoms, each of two X's which may be the same or different from each other, is a halogen, a hydrogen, a hydrocarbon group having 1 to 20 carbon atoms, a halogenated hydrocarbon group, an alkylamino group, an alkoxy group, an aryloxy group of the formula —O—Ar—$Y_p$, a thioalkyl group, or a thioaryl group of the formula —S—Ar—$Y_p$; wherein Ar is an aromatic ring, Y is a halogen, a hydrogen, a hydrocarbon group having 1 to 20 carbon atoms, a halogenated hydrocarbon group, an alkoxy group, an alkylamino group, a cyano group or a nitro group, and p is an integer of from 1 to 5, and each of m and n is an integer of from 0 to 4, provided that m and n are not equal, and m+n is an integer of from 3 to 6, and an aluminoxane (B), is used.

20 Claims, No Drawings

METHOD FOR PRODUCING AN OLEFIN TYPE COPOLYMER HAVING A CYCLIC STRUCTURE

The present invention relates to a method for producing an olefin type copolymer having a cyclic structure. More particularly, the present invention relates to a method which comprises copolymerizing ethylene and dicyclopentadiene or tricyclopentadiene, and, as optionally introduced, a cyclic olefin, in the presence of a catalyst system comprising a metallocene compound and an aluminoxane, whereby an olefin type copolymer having a cyclic structure, which has a high content of dicyclopentadiene or tricyclopentadiene, or a cyclic olefin, and which has a narrow molecular weight distribution, can be produced efficiently with a high catalytic activity.

An olefin type addition polymer having a cyclic structure obtainable by copolymerization of an α-olefin with a cyclic olefin represented by 2-norbornene, or a so-called cyclic polyene containing at least two double bonds in its molecule (hereinafter sometimes referred to simply as a cyclic structure-containing copolymer), usually has a high glass transition temperature or high transparency as compared with an olefin type polymer containing no cyclic structure, and accordingly, it is expected to be useful for various molded products including optical materials. Various methods have been known for the production of such a ring structure-containing copolymer. With respect to a copolymer of an α-olefin with norbornene and its derivatives, or a cyclic olefin such as a cyclopentadiene derivative, for example, JP-A-60-168708 or JP-A-61-271308 discloses a method of using a catalyst comprising a vanadium compound and an organic aluminum compound. However, such a method had a problem that the catalytic activity was low. As methods to have such a problem overcome, JP-A-61-221206, JP-A-64-106 and JP-A-2-173112 disclose methods of using catalysts comprising various metallocene compounds and aluminoxanes. These methods are improved from the viewpoint that the catalytic activities are relatively high, and good catalytic efficiency can be accomplished. However, the efficiency for copolymerization of the cyclic olefin to the α-olefin is inadequate. Accordingly, it is desired to have the polymerization activities further improved or to have the efficiency for copolymerization of the cyclic olefin and the cyclic polyene to the α-olefin improved.

On the other hand, a method for producing a cyclic structure-containing copolymer by copolymerizing an α-olefin with a cyclic polyene as dicyclopentadiene or its derivative, is also known. For example, JP-A-63-243103 or JP-A-63-314220 discloses a method of employing a catalyst comprising a vanadium compound and an organic aluminum compound, and JP-A-7-70250 discloses a method of using a catalyst comprising a metallocene compound and an aluminoxane. However, these methods also had a problem that not only the catalytic activities were low, but also the efficiency for copolymerization of a cyclic polyene such as dicyclopentadiene to the α-olefin was low. Thus, an industrially adequately satisfactory method has not yet been found for the production of an olefin type copolymer having a cyclic structure.

A cyclic polyene such as dicyclopentadiene or tricyclopentadiene to be used in the present invention, has two isomers i.e. an exoform isomer and an endoform isomer, and the proportion of the endoform isomer is predominant, which has a five-membered ring constituting a stereostructure closer to the ring containing a double bond to be involved in polymerization. Such a close five-membered ring constitutes a steric hindrance, whereby polymerization tends to be difficult. Further, it is known that a copolymer obtained by using, as a starting material, a cyclic polyene such as dicyclopentadiene or tricyclopentadiene, is usually susceptible to crosslinking as compared with a case where a cyclic olefin is employed, whereby a gelled polymer component is likely to be formed, and as a result, a polymer insoluble in a solvent tends to be formed. Whereas, in an application to e.g. an optical material, the uniformity of the material is important, and if such a gelled polymer component insoluble in a solvent is formed, the commercial value will be substantially impaired. Accordingly, dicyclopentadiene or tricyclopentadiene as a monomer for copolymerization, is essentially a material not preferred for the purpose of obtaining an olefin type addition polymer.

The above-mentioned gelled polymer component is likely to be formed usually when the catalytic activities are low, or when the efficiency for copolymerization of the catalyst is so poor that it is obliged to increase the charge of the cyclic polyene, or when the polymerization temperature is made high. Such a problem is attributable to an inadequate performance of the catalyst, and a catalyst having a high performance which brings about no such a problem, is desired.

Accordingly, it is an object of the present invention to provide a method whereby, even if a cyclic polyene such as dicyclopentadiene or tricyclopentadiene which is hardly copolymerizable with an α-olefin, is used as a monomer material, a gelled polymer component will not be formed, the efficiency for copolymerization of a cyclic polyene and a cyclic olefin is high, polymerization activity is excellent, and still it is possible to efficiently produce an olefin type copolymer having a cyclic structure and a narrow molecular weight distribution.

The present inventors have conducted an extensive research on a method for producing an olefin type copolymer having a cyclic structure by means of a metallocene type catalyst, and as a result, have found that when a metallocene compound having a certain specific structure is combined with an aluminoxane, it is possible to solve all of the above problems and to accomplish the object of the present invention. The present invention has been accomplished on the basis of this discovery.

Namely, the present invention provides a method for producing an olefin type copolymer having a cyclic structure, which comprises copolymerizing ethylene (M1) and dicyclopentadiene or tricyclopentadiene (M2), and, as optionally introduced, a cyclic olefin (M3), wherein, as a catalyst, a catalyst comprising a metallocene compound (A) of the following formula [1]:

$$H_2C(R'_mCp)(R''_nCp)MX_2 \qquad [1]$$

wherein M is zirconium or hafnium, Cp is a group having a cyclopentadienyl skeleton, each of R' and R" is a hydrocarbon group having 1 to 10 carbon atoms, each of two X's which may be the same or different from each other, is a halogen atom, a hydrogen atom, a hydrocarbon group having 1 to 20 carbon atoms, a halogenated hydrocarbon group, an alkylamino group, an alkoxy group, an aryloxy group of the formula —O—Ar—Y$_p$ (wherein Ar is an aromatic ring, Y is a halogen atom, a hydrogen atom, a hydrocarbon group having 1 to 20 carbon atoms, a halogenated hydrocarbon group, an alkoxy group, an alkylamino group, a cyano group or a nitro group, and p is an integer of from 1 to 5), a thioalkyl group, or a thioaryl group of the formula —S—Ar—Y$_p$ (wherein Ar, Y and p are as defined above), and each of n and m is an integer of from 0 to 4, provided that m and n are not equal, and m+n is an integer of from 3 to 6, and an aluminoxane (B), is used.

In the present invention, a specifically good result is obtained when the metallocene compound (A) is a compound wherein two cyclopentadiene rings bonded to the transition metal atom are different (asymmetric) and the two cyclopentadiene rings are bonded by a methylene group.

Now, the present invention will be described in further detail with reference to the preferred embodiments.

Among the monomer components (M2) to be used in the present invention, dicyclopentadiene is called also as 3a,4,7,7a-tetrahydro-4,7-methanoindene and is obtainable in a relatively large amount from the decomposition components of naphtha. Among the components (M2), tricyclopentadiene is a trimer of cyclopentadiene and is easily be formed by heating dicyclopentadiene at a temperature of at least 100° C. This compound has two isomers which are, respectively, called 4.9,5.8-dimethano-3a,4,4a,5,8,8a,9,9a-octahydro-1H-benzoindene(I) and 1.4,5.8-dimethano-1,4,4a,4b,5,8,8a,9a-octahydro-9H-fluorene (II). Usually, the ratio of (I) to (II) is 95/5 to 75/25 (weight ratio). In the present invention, such a mixture may be used without any particular problem.

Further, the cyclic olefin (M3) to be used in the present invention, is a compound of the formula [2]:

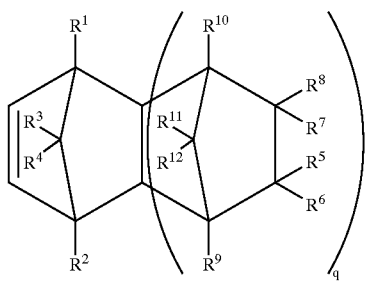

[2]

wherein each of $R^1$ to $R^{12}$ is a substituent selected from the group consisting of a hydrogen atom, a halogen atom and a hydrocarbon group having 1 to 20 carbon atoms, provided that $R^5$ and $R^7$ may form a ring together with the carbon atoms, to which they are respectively bonded, and q is an integer of at least 0.

Specific examples of the cyclic olefin (M3) include 2-norbornene, 1,4,5,8-dimethano-1,2,3,4,4a,5,8,8a-octahydronaphthalene, 5-methyl-2-norbornene, 5-ethyl-2-norbornene, 5-propyl-2-norbornene, 5-phenyl-2-norbornene, 5-benzyl-2-norbornene, 5-ethylidene-2-norbornene, 5-vinyl-2-norbornene, 5-chloro-2-norbornene, 5-fluoro-2-norbornene, 5-chloromethyl-2-norbornene, 5-methoxy-2-norbornene, 7-methyl-2-norbornene, 5-isobutyl-2-norbornene, 5,6-dimethyl-2-norbornene, 5,5-dichloro-2-norbornene, 5,5,6-trimethyl-2-norbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene and 2,3-dimethyl-1,4,5,8-dimethano-1,2,3,4,4a,5,8,8a-octahydronaphthalene.

Among them, a particularly preferred cyclic olefin (M3) is 2-norbornene or 1,4,5,8-dimethano-1,2,3,4,4a,5,8,8a-octahydronaphthalene.

One constituting component of the catalyst to be used in the present invention, is a metallocene compound (A) which is represented by the formula [1]:

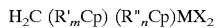

[1]

In the formula, M is zirconium or hafnium, Cp is a group having a cyclopentadienyl skeleton, each of R' and R" is a hydrocarbon group having 1 to 10 carbon atoms, each of two X's which may be the same or different from each other, is a halogen atom, a hydrogen atom, a hydrocarbon group having 1 to 20 carbon atoms, a halogenated hydrocarbon group, an alkylamino group, an alkoxy group, an aryloxy group of the formula —O—Ar—$Y_p$ (wherein Ar is an aromatic ring, Y is a halogen atom, a hydrogen atom, a hydrocarbon group having 1 to 20 carbon atoms, a halogenated hydrocarbon group, an alkoxy group, an alkylamino group, a cyano group or a nitro group, and p is an integer of from 1 to 5), a thioalkyl group, or a thioaryl group represented by the formula —S—Ar—$Y_p$ (wherein Ar, Y and p are as defined above), and each of m and n is an integer of from 0 to 4, provided that m and n are not equal, and m+n is an integer of from 3 to 6.

In the above formula [1], when each of R' and R" is a hydrocarbon group having 1 to 10 carbon atoms, it may specifically be, for example, a methyl group, an ethyl group, a propyl group, an isopropyl group, a butyl group, a hexyl group, an octyl group, a 2-ethylhexyl group or a decyl group. Preferred is a hydrocarbon group having 1 to 6 carbon atoms, such as a methyl group, an ethyl group, a propyl group, an isopropyl group, a butyl group or a hexyl group.

In the above formula [1], when substituent X or substituent Y is a halogen atom, its specific examples include fluorine, chlorine, bromine and iodine.

When substituent X or substituent Y is a hydrocarbon group having 1 to 20 carbon atoms, it may specifically be, for example, an alkyl group such as a methyl group, an ethyl group, a propyl group, a butyl group, a pentyl group, a hexyl group, an octyl group or a decyl group; a cycloalkyl group such as a cyclohexyl group or a cyclooctyl group; an aryl group such as a phenyl group or a naphthyl group; an alkenyl group such as a vinyl group or a propenyl group; an alkenyl group such as an ethynyl group or a propynyl group; an aryl alkyl group such as a benzyl group or a phenetyl group; an aryl alkenyl group such as a styryl group or cinnamyl group; or an alkyl aryl group such as a tolyl group, a xylyl group or a mesyl group.

When substituent X or substituent Y is a halogenated hydrocarbon group, it may specifically be, for example, a chloromethyl group, a fluoromethyl group, a bromomethyl group, an iodomethyl group, a dichloromethyl group, a difluoromethyl group, a trichloromethyl group, a trifluoromethyl group, or a chlorophenyl group.

When substituent X or substituent Y is an alkylamino group, it may specifically be, for example, an N-methylamino group, an anilino group, an N,N-dimethylamino group, an N,N-diethylamino group or an N,N-diphenylamino group.

When substituent X or substituent Y is an alkoxy group, it may specifically be, for example, a methoxy group, an ethoxy group, a propoxy group or a butoxy group.

When substituent X is an alkylthio group, it may specifically be, for example, a methylthio group, an ethylthio group, a propylthio group or a butylthio group.

Further, when substituent X in the formula [1] is a —O—Ar—Y group, it may specifically be, for example, 2-fluorophenoxy, 3-fluorophenoxy, 4-fluorophenoxy, 2-chlorophenoxy, 3-chlorophenoxy, 4-chlorophenoxy, 2-bromophenoxy, 3-bromophenoxy, 4-bromophenoxy, 2-iodophenoxy, 3-iodophenoxy, 4-iodophenoxy, 2,3-difluorophenoxy, 2,4-difluorophenoxy, 2,5-difluorophenoxy, 2,6-difluorophenoxy, 3,4-difluorophenoxy, 3,5-difluorophenoxy, 2,3-dichlorophenoxy, 2,4-dichlorophenoxy, 2,5-dichlorophenoxy, 2,6-dichlorophenoxy, 3,4-dichlorophenoxy, 3,5- dichlorophenoxy, 2,3,4-trifluorophenoxy, 2,3,5-trifluorophenoxy, 2,3,6-trifluorophenoxy, 2,4,5-trifluorophenoxy, 2,4,6-trifluorophenoxy, 3,4,5-trifluorophenoxy, 2,3,5,6-tetrafluorophenoxy, pentafluorophenoxy, 2-fluoromethylphenoxy, 3-fluoromethylphenoxy, 4-fluoromethylphenoxy, 2-chloromethylphenoxy, 3-chloromethylphenoxy, 4-chloromethylphenoxy, 2-trifluoromethylphenoxy, 3-trifluoromethylphenoxy, 4-trifluoromethylphenoxy, 3,5-bis(trifluoromethyl)phenoxy, 2-(2,2,2-trifluoroethyl)phenoxy, 3-(2,2,2-trifluoroethyl)phenoxy, 4-(2,2,2-trifluoroethyl)phenoxy, 2-trichloromethylphenoxy, 3-trichloromethylphenoxy, 4-trichloromethylphenoxy, 2-methylphenoxy, 3-methylphenoxy, 4-methylphenoxy, 2,3-dimethylphenoxy, 2,4-dimethylphenoxy 2,5-dimethylphenoxy, 2,6-dimethylphenoxy, 3,4-dimethylphenoxy, 3,5-dimethylphenoxy, 2,3,4-trimethylphenoxy, 2,3,5-trimethylphenoxy, 2,3,6-trimethylphenoxy, 2,4,5-trimethylphenoxy, 2,4,6-trimethylphenoxy, 3,4,5-trimethylphenoxy, pentamethylphenoxy, 2-methyl-4-fluorophenoxy, 2-chloro-4-fluorophenoxy, 2-chloro-4-trifluoromethylphenoxy, 2-fluoro-4-trifluoromethylphenoxy, 2-trifluoromethyl-4-fluorophenoxy, 2-ethylphenoxy, 3-ethylphenoxy, 4-ethylphenoxy, 2-isopropylphenoxy, 3-isopropylphenoxy, 4-isopropylphenoxy, 2-tert-butylphenoxy, 3-tert-butylphenoxy, 4-tert-butylphenoxy, 3,5-di-tert-butylphenoxy, 2-cyclohexylphenoxy, 3-cyclohexylphenoxy, 4-cyclohexylphenoxy, 1-naphthoxy, 2-naphthoxy, 8-trifluoromethyl-1-naphthoxy, 2,8-dimethyl-1-naphthoxy, 1-tert-butyl-2-naphthoxy, 8-bromo-2-naphthoxy, 2-phenylphenoxy, 3-phenylphenoxy, 4-phenylphenoxy, 2-benzylphenoxy, 3-benzylphenoxy, 4-benzylphenoxy, 2-tolylphenoxy, 3-tolylphenoxy, 4-tolylphenoxy, 2-vinylphenoxy, 3-vinylphenoxy, 4-vinylphenoxy, 2-(2-propenyl)phenoxy, 3-(2-propenyl)phenoxy, 4-(2-propenyl)phenoxy, 2-methyl-6-(2-propenyl)phenoxy, 2-ethynylphenoxy, 3-ethynylphenoxy, 4-ethynylphenoxy, 2-methoxyphenoxy, 3-methoxyphenoxy, 4-methoxyphenoxy, 2-tert-butoxyphenoxy, 3-tert-butoxyphenoxy, 4-tert-butoxyphenoxy, 2-phenoxyphenoxy, 3-phenoxyphenoxy, 4-phenoxyphenoxy, 2-formylphenoxy, 3-formylphenoxy, 4-formylphenoxy, 2-acetylphenoxy, 3-acetylphenoxy, 4-acetylphenoxy, 2-benzoylphenoxy, 3-benzoylphenoxy, 4-benzoylphenoxy, 2-cyanophenoxy, 3-cyanophenoxy, 4-cyanophenoxy, 2-nitrophenoxy, 3-nitrophenoxy, 4-nitrophenoxy, 2-anilinophenoxy, 3-anilinophenoxy, 4-anilinophenoxy, 2-dimethylaminophenoxy, 3-dimethylaminophenoxy, 4-dimethylaminophenoxy, 2-dimethylaminomethylphenoxy, 3-dimethylaminomethylphenoxy or 4-dimethylaminomethylphenoxy.

Further, when substituent X is a —S—Ar—Y group, it may specifically be, for example, 2-methylthiophenoxy, 3-methylthiophenoxy, 4-methylthiophenoxy, 2-tert-butylthiophenoxy, 3-tert-butylthiophenoxy, 4-tert-butylthiophenoxy, 2-fluorothiophenoxy, 3-fluorothiophenoxy, 4-fluorothiophenoxy, 2-chlorothiophenoxy, 3-chlorothiophenoxy, 4-chlorothiophenoxy, 2-trifluoromethylthiophenoxy, 3-trifluoromethylthiophenoxy, 4-trifluoromethylthiophenoxy, 2-methoxythiophenoxy, 3-methoxythiophenoxy, 4-methoxythiophenoxy, 2-cyanothiophenoxy, 3-cyanothiophenoxy, 4-cyanothiophenoxy, 2-nitrothiophenoxy, 3-nitrothiophenoxy, 4-nitrothiophenoxy, 2-anilinothiophenoxy, 3-anilinothiophenoxy, 4-anilinothiophenoxy, 2-dimethylaminothiophenoxy, 3-dimethylaminothiophenoxy, 4-dimethylaminothiophenoxy, 2-dimethylaminomethylthiophenoxy, 3-dimethylaminomethylthiophenoxy or 4-dimethylaminomethylthiophenoxy.

Specific examples of the metallocene compound (A) of the formula [1] include methylene(cyclopentadienyl)(tetramethylcyclopentadienyl) zirconium dichloride, methylene(2-methylcyclopentadienyl)(tetramethylcyclopentadienyl) zirconium dichloride, methylene(3-methylcyclopentadienyl)(tetramethylcyclopentadienyl)zirconium dichloride, methylene(cyclopentadienyl)(2,3,5-trimethylcyclopentadienyl)zirconium dichloride, methylene(cyclopentadienyl)(2,3,4-trimethylcyclopentadienyl)zirconium dichloride, methylene(2-methylcyclopentadienyl)(2,3,4-trimethylcyclopentadienyl)zirconium dichloride, methylene(3-methylcyclopentadienyl)(2,3,5-trimethylcyclopentadienyl)zirconium dichloride, methylene(2-methylcyclopentadienyl)(2,3-dimethylcyclopentadienyl)zirconium dichloride, methylene(3-methylcyclopentadienyl)(2,4-dimethylcyclopentadienyl)zirconium dichloride, methylene(2-methylcyclopentadienyl)(2,5-dimethylcyclopentadienyl)zirconium dichloride, methylene(2-methylcyclopentadienyl)(2,3,5-trimethylcyclopentadienyl)zirconium dichloride, methylene(3-methylcyclopentadienyl)(2,3,4-trimethylcyclopentadienyl)zirconium dichloride, methylene(2-methylcyclopentadienyl)(2,4-dimethylcyclopentadienyl)zirconium dichloride, methylene(2-methylcyclopentadienyl)(3,4-dimethylcyclopentadienyl)zirconium dichloride, methylene(3-methylcyclopentadienyl)(2,3-dimethylcyclopentadienyl)zirconium dichloride, methylene(3-methylcyclopentadienyl)(2,5-dimethylcyclopentadienyl)zirconium dichloride, methylene(3-methylcyclopentadienyl)(3,4-dimethylcyclopentadienyl)zirconium dichloride, methylene(2,3-dimethylcyclopentadienyl)(2,3,5-trimethylcyclopentadienyl)zirconium dichloride, methylene(2,4-dimethylcyclopentadienyl)(2,3,5-trimethylcyclopentadienyl)zirconium dichloride, methylene(2,3-dimethylcyclopentadienyl)(2,3,4-trimethylcyclopentadienyl)zirconium dichloride, methylene(2,3-dimethylcyclopentadienyl)(tetramethylcyclopentadienyl)zirconium dichloride, methylene(2,4-dimethylcyclopentadienyl)(tetramethylcyclopentadienyl)zirconium dichloride, methylene(2,5-dimethylcyclopentadienyl)(tetramethylcyclopentadienyl)zirconium dichloride, methylene(3,4-dimethylcyclopentadienyl)(tetramethylcyclopentadienyl)zirconium dichloride, methylene(2,4-dimethylcyclopentadienyl)(2,3,4-trimethylcyclopentadienyl)zirconium dichloride, methylene(2,5-dimethylcyclopentadienyl)(2,3,4-trimethylcyclopentadienyl)zirconium dichloride, methylene(2,5-dimethylcyclopentadienyl)(2,3,5-trimethylcyclopentadienyl)zirconium dichloride, methylene(3,4-dimethylcyclopentadienyl)(2,3,4-trimethylcyclopentadienyl)zirconium dichloride, methylene(3,4-dimethylcyclopentadienyl)(2,3,5-trimethylcyclopentadienyl)zirconium dichloride, methylene(3-ethylcyclopentadienyl) (tetramethylcyclopentadienyl)

zirconium dichloride, methylene(cyclopentadienyl)(tetramethylcyclopentadienyl) bis(2-fluorophenoxy)zirconium, methylene(3-methylcyclopentadienyl)(tetramethylcyclopentadienyl)bis(2 -fluorophenoxy)zirconium, methylene(cyclopentadienyl)(tetramethylcyclopentadienyl) zirconium dimethyl, methylene(cyclopentadienyl)(tetramethylcyclopentadienyl) zirconium diphenyl, methylene(cyclopentadienyl)(tetramethylcyclopentadienyl) bis(2-trifluoromethylphenoxy)zirconium, methylene (cyclopentadienyl)(tetramethylcyclopentadienyl) bis (2-methyl, 4-fluorophenoxy) zirconium, methylene(cyclopentadienyl)(tetramethylcyclopentadienyl) zirconium dimethoxide, methylene(cyclopentadienyl)(tetramethylcyclopentadienyl) zirconium diphenoxide, methylene(3-methylcyclopentadienyl)(tetramethylcyclopentadienyl) zirconium dithiophenoxide, methylene(3-methylcyclopentadienyl)(tetramethylcyclopentadienyl)bis(4-cyanophenoxy)zirconium, and methylene(2-n-butylcyclopentadienyl)(tetramethylcyclopentadienyl)bis(2-trifluoromethylphenoxy)zirconium.

Furthermore, the corresponding hafnium compounds having the transition metal atoms in the above-mentioned compounds changed from zirconium to hafnium, may likewise be used.

The aluminoxane (B) as another component constituting the catalyst to be used in the method of the present invention, is presented by the following formula [3]:

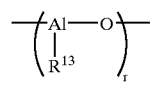

[3]

In the formula, $R^{13}$ is an alkyl group having 1 to 8 carbon atoms, and r is a number of from 4 to 100.

$R^{13}$ may specifically be, for example, a methyl group, an ethyl group, a propyl group, an isobutyl group or a combination thereof. A preferred aluminoxane is an aluminoxane of the formula [3] wherein all or the majority of $R^1$ is a methyl group, i.e. a methylaluminoxane. Such an aluminoxane (B) usually has a molecular weight of from 200 to 10,000, and its structure may be of a linear structure, or a compound wherein both terminals are bonded to form a ring, may also be used.

Various known methods may be used for the synthesis of the aluminoxane (B). For example, it can be synthesized by a method wherein a trialkylaluminum is dissolved in a hydrocarbon solvent, and water in an equivalent amount to the trialkylaluminum is gradually added to the solution for hydrolysis, a method wherein copper sulfate hydrate or aluminum sulfate hydrate is suspended in a hydrocarbon solvent and contacted with a trialkylaluminum in an amount of from 1 to 3 equivalents to the hydrate crystal water in this suspension to slowly hydrolyze the trialkylaluminum, or a method wherein a trialkylaluminum in an amount of from 1 to 3 equivalent is contacted to adsorbed water of nondehydrated silica gel suspended in a hydrocarbon solvent to slowly hydrolyze the trialkylaluminum.

The above catalyst components (A) and (B) may be used as they are, but they may be supported on a carrier, as the case requires. As such a carrier, an inorganic compound such as silica, alumina or magnesium chloride, or an organic polymer compound such as polyethylene or polypropylene, may, for example, be mentioned.

Copolymerization of ethylene (M1) with dicyclopentadiene or tricyclopentadiene (M2), or copolymerization of (M1) and (M2) and a cyclic olefin (M3) incorporated as the case requires, in the method of the present invention, is induced by the above-mentioned catalyst comprising the metallocene compound (A) and the aluminoxane (B). This catalyst is usually formed by contacting the two components. An optional method may be employed as a method of contacting them. Namely, the metallocene compound (A) and the aluminoxane (B) may be preliminarily mixed in a suitable solvent, and they may be supplied to the polymerization system in the form of a solution. Otherwise, the metallocene compound (A) and the aluminoxane (B), or their solutions in monomers or in suitable solvents, may be supplied to the polymerization system simultaneously or separately to let them contact in the polymerization system.

The amount of the metallocene compound (A) to be used in the copolymerization of the present invention, is usually within a range of from $10^{-6}$ to 1 g atom/l, preferably from $10^{-5}$ to $10^{-1}$ g atom/l, as the concentration of the transition metal in the polymerization reaction system. Further, the amount of the aluminoxane (B) is usually within a range of from $10^{-4}$ to 10 g atom/l, preferably from $10^{-3}$ to 1 g atom/l, as the concentration of aluminum atoms in the polymerization reaction system. The ratio of the aluminoxane (B) to the metallocene compound (A) in the polymerization reaction system is usually within a range of from 1 to $10^7$, preferably from 10 to $10^5$, as the ratio of aluminum atoms in the aluminoxane (B) per mol of the metallocene compound (A).

For the polymerization in the present invention, any polymerization method may be employed such as a gas phase polymerization method, a bulk polymerization method, or a solution or slurry polymerization method employing a suitable solvent. These methods may be batchwise or continuous. In a case where a solvent is used, an inert hydrocarbon solvent is usually employed, but dicyclopentadiene, tricyclopentadiene or a cyclic olefin itself, which is a monomer to be used for the polymerization, may be used as the solvent. As the inert hydrocarbon solvent, an aliphatic hydrocarbon such as butane, isobutane, pentane, hexane, octane or decalin; an alicyclic hydrocarbon such as cyclopentane, methylcyclopentane, cyclohexane, methylcyclohexane or dimethylcyclohexane; an aromatic hydrocarbon such as benzene, toluene or xylene; or a petroleum fraction such as naphtha, kerosine oil or light oil, may, for example, be used.

With respect to the polymerization conditions of the present invention, the temperature is usually from −100 to 250° C., preferably from −50 to 200° C., and the pressure is usually at most 10 MPa, preferably from atmospheric pressure to 5 MPa.

In the cyclic structure-containing copolymer obtained by the method of the present invention, units derived from ethylene (Ml) are within a range of from 5 to 99 mol %, preferably from 15 to 95 mol %, particularly preferably from 30 to 90 mol %, units derived from dicyclopentadiene or tricyclopentadiene (M2) are within a range of from 1 to 95 mol %, preferably from 5 to 85 mol %, particularly preferably from 10 to 70 mol %, and units derived from a cyclic olefin (M3) are within a range of from 0 to 90 mol %, preferably from 0 to 80 mol %, particularly preferably from 0 to 70 mol %. The units derived from ethylene (M1), the units derived from dicyclopentadiene or tricyclopentadiene (M2) and the units derived from a cyclic olefin (M3) are randomly arranged to form a substantially linear olefin type random copolymer. The fact that the cyclic structure-containing copolymer of the present invention is substantially linear and has no gelled crosslinking structure, can be ascertained by the fact that the obtained copolymer dissolves completely in decalin at 135° C.

Further, the molecular weight of the cyclic structure-containing copolymer of the present invention is such that the weight average molecular weight Mw measured by gel permeation chromatography (GPC) is usually within a range of from 500 to 2,000,000, particularly from 1,000 to 1,000,000, and the number average molecular weight Mn is from 300 to 1,000,000, particularly preferably from 500 to 500,000. Here, the Mw/Mn value as an index of the molecular weight distribution is usually from 1.5 to 4.5. If the Mw/Mn value exceeds 4.5, and when the cyclic olefin type copolymer of the present invention is to be used for an optical material after being modified chemically, the mechanical strength tends to deteriorate, and a uniform molded product can hardly be obtainable. The cyclic structure-containing copolymer of the present invention has a narrow molecular weight distribution, and a uniform distribution of the monomer composition, whereby it is excellent in heat resistance and mechanical properties.

The cyclic structure-containing copolymer of the present invention may be used as it is, but since it contains an olefinic double bond, a chemical modification such as epoxidation, oxidation, chlorination or bromination may be carried out by utilizing such a double bond, to let it have properties more suitable for various applications, before use. With respect to specific applications, a low molecular weight product is useful in the fields of e.g. a toner for electrostatic copying, a hot-melt adhesive, a ceramic binder and a photoresist substrate, and a high molecular weight product is useful in various fields such as an optical field of e.g. an optical lens, an optical disk or an optical fiber, an electric field of e.g. an electric oven, a liquid crystal display substrate, a printed circuit board or a transparent electroconductive film and a medical and chemical field of e.g. an injection syringe, a pipette or an animal gauge.

Now, the present invention will be described in further detail with reference to Examples. However, it should be understood that the present invention is by no means restricted to such specific Examples.

In the Examples, the copolymer composition (mol %) was obtained by $^{13}$C-NMR spectroscopy (100 MHz, temperature: room temperature, solvent: deuterated benzene), and the weight average molecular weight (Mw), the number average molecular weight (Mn) and the molecular weight distribution (Mw/Mn) were obtained by the measurements by a high temperature gel permeation chromatography (GPC) under such conditions that the temperature was 135° C. and the solvent was 1,2,4-trichlorobenzene. Further, the reactions for the syntheses of metallocene compounds in the Reference Examples were all carried out in an inert gas atmosphere, and the reaction solvent used, was preliminarily dried.

REFERENCE EXAMPLE 1

Preparation of Methylene(Cyclopentadienyl) (Tetramethylcyclopentadienyl) Zirconium Dichloride In a 300 ml glass reactor, 1.09 g of 1,2,3,4,5-pentamethylcyclopentadiene was dissolved in 100 ml of hexane, and then 8 ml of a 1.0 molar diethyl ether solution of tert-butyl lithium was dropwise added over one hour at −78° C. Then, the mixture was heated to room temperature over one hour and further stirred at room temperature for 12 hours. Then, 100 ml of 1,2-dimethoxyethane was added thereto, followed by cooling to −15° C., and then 3.8 g of triphenylcarbenium hexafluorophosphate was added thereto. The reaction mixture was heated to room temperature and reacted for 2.5 hours at room temperature, whereupon water was added to the reaction mixture to terminate the reaction. Then, the organic layer was separated and dried over anhydrous sodium sulfate, and then, the solvent was distilled off under reduced pressure, whereupon the obtained oily component was purified by column chromatography (neutral alumina/hexane) to obtain 0.75 g of 1,2,3,4-tetramethylfulvene as an orange color oily substance. Then, 0.5 g of cyclopentadiene obtained by thermally decomposing dicyclopentadiene was dissolved in 100 ml of tetrahydrofuran in a 200 ml glass flask, and then 5 ml of a 1.6 molar hexane solution of n-butyl lithium was dropwise added thereto over one hour at −78° C. Then, the mixture was heated to room temperature over one hour and further stirred for 3 hours at room temperature. This solution was again cooled to −78° C., and 0.75 g of 1,2,3,4-tetramethylfulvene previously obtained, was dropwise added thereto at −78° C. The mixture was heated to room temperature over one hour and further stirred at room temperature for 12 hours. Water was added to this solution to terminate the reaction. Then, the organic layer was separated and dried over anhydrous sodium sulfate, and then, the solvent was distilled off under reduced pressure, whereupon the obtained oily component was purified by column chromatography (neutral alumina/hexane) to obtain 0.84 g of cyclopentadienyl(2,3,4,5-tetramethylcyclopentadienyl)methane. 0.84 g of this cyclopentadienyl(2,3,4,5-tetramethylcyclopentadienyl) methane was dissolved in 50 ml of diethyl ether in a 100 ml glass reactor, and then, 2.7 ml of a 1.6 molar hexane solution of n-butyl lithium was dropwise added thereto over one hour at −78° C. Then, the mixture was heated to room temperature over one hour and further stirred at room temperature for 12 hours. To this solution, 0.97 g of zirconium tetrachloride suspended in 20 ml of hexane, was added at −78° C., and the mixture was heated to room temperature over one hour and further stirred at room temperature for 12 hours. Then, a formed precipitate (LiCl) was removed by filtration, and the solvent was distilled off from the filtrate under reduced pressure, whereupon the solid component thereby obtained was extracted with hexane. Hexane was distilled off under reduced pressure, and the obtained crude product was further recrystallized from hexane to obtain 1.2 g of the desired product i.e. methylene(cyclopentadienyl) (tetramethylcyclopentadienyl) zirconium dichloride as yellowish green crystals.

REFERENCE EXAMPLE 2

Preparation of Methylene(3-methylcyclopentadienyl) (Tetramethylcyclopentadienyl) Zirconium Dichloride In a 300 ml glass reactor, 0.95 g of 1,2,3,4,5-pentamethylcyclopentadiene was dissolved in 100 ml of hexane, and then 7 ml of a 1.0 molar diethyl ether solution of tert-butyl lithium, was dropwise added thereto over one hour at −78° C. Then, the mixture was heated to room temperature over one hour and further stirred at room temperature for 12 hours. Then, 100 ml of 1,2-dimethoxyethane was added to the mixture, followed by cooling to −15° C., and 3.3 g of triphenylcarbenium hexafluorophosphate was added thereto. The reaction mixture was heated to room temperature and reacted for 2.5 hours at room temperature, whereupon water was added to terminate the reaction. Then, the organic layer was separated and dried over anhydrous sodium sulfate, and then, the solvent was distilled off under reduced pressure, whereupon the obtained oily component was purified by column chromatography (neutral alumina/hexane) to obtain 0.61 g of 1,2,3,4-tetramethylfulvene as an orange color oily substance. Then, 0.44 g of methylcyclopentadiene obtained by thermally decomposing methylcyclopentadiene dimmer, was dissolved in 100 ml of tetrahydrofuran in a 200 ml glass flask, and then 3.5 ml of a 1.6 molar hexane solution of n-butyl lithium was dropwise added thereto over one hour at −78° C. Then, the mixture was heated to room temperature over one hour and further stirred for 3 hours at room temperature. This solution was again cooled to −78° C., and 0.61 g of 1,2,3,4-tetramethylfulvene previously obtained, was dropwise added thereto at −78° C. The mixture was heated to room temperature over one hour and further stirred at room temperature for 12 hours. Water was added to this solution to terminate the reaction. Then, the organic layer was separated and dried over anhydrous sodium sulfate, and then, the solvent was distilled off under reduced pressure, whereupon the obtained oily component was purified by column chromatography (neutral alumina/hexane) to obtain 0.83 g of 3-methylcyclopentadienyl(2,3,4,5-tetramethylcyclopentadienyl)methane. Then, 0.83 g of this 3-methylcyclopentadienyl(2,3,4,5-tetramethylcyclopentadienyl)methane was dissolved in 50 ml of diethyl ether in a 100 ml glass reactor, and then, 2.5 ml of a 1.6 molar hexane solution of n-butyl lithium was dropwise added thereto over one hour at −78° C. Then, the mixture was heated to room temperature over one hour and further stirred at room temperature for 12 hours. To this solution, 0.9 g of zirconium tetrachloride suspended in 20 ml of hexane, was added at −78° C., and the mixture was heated to room temperature over one hour and further stirred at room temperature for 12 hours. Then, a formed precipitate (LiCl) was removed by filtration, and the solvent was distilled off from the filtrate under reduced pressure, whereupon the solid component thereby obtained was extracted with hexane. Hexane was distilled off under reduced pressure, and the obtained crude product was further recrystallized from hexane to obtain 1.1 g of the desired product i.e. methylene(3-methylcyclopentadienyl)(tetramethylcyclopentadienyl) zirconium dichloride as yellowish green crystals.

EXAMPLE 1

Into a 200 ml autoclave flushed with nitrogen, 80 ml of dehydrated and purified toluene, 20 g (150 mmol) of dicyclopentadiene and 3.2 ml of a toluene solution of methylaluminoxane (MMAO, manufactured by Tosoh Akzo K.K., 1.87 mol/l as the concentration based on Al) were charged and stirred under heating to obtain a uniform solution of 60° C. Then, 1.04 μmol of a toluene solution of methylene (cyclopentadienyl)(tetramethylcyclopentadienyl) zirconium dichloride obtained in Reference Example 1, was added thereto, and stirring was continued for 30 minutes at 60° C. while maintaining an ethylene pressure of 0.294 MPa. After completion of the polymerization, the formed liquid was put into hydrochloric acid/methanol, and a precipitated white solid was collected by filtration. The obtained white solid was washed with methanol and then dried under reduced pressure to obtain 5.76 g of an ethylene/dicyclopentadiene copolymer. The catalytic activity was 63.1 kg polymer/g-Zr, and the content of dicyclopentadiene component (monomer units) in this copolymer was 47.6 mol %. Further, Mw and Mw/Mn by the GPC measurement were 143,000 and 1.7, respectively. The content of the dicyclopentadiene component was higher than e.g. in Comparative Example 1 given below, and the molecular weight distribution was narrow.

COMPARATIVE EXAMPLE 1

A copolymerization reaction was carried out in the same manner as in Example 1 except that in Example 1, the metallocene compound was changed to ethylenebisindenyl zirconium dichloride, and then post-treatment of a product was carried out. 1.97 g of an ethylene/dicyclopentadiene copolymer was obtained, and the catalytic activity was 21.6 kg polymer/g-Zr. The content of the dicyclopentadiene component in the copolymer was 38.3 mol %. As compared with Example 1, the catalytic activity and the dicyclopentadiene content were low.

COMPARATIVE EXAMPLE 2

A copolymerization reaction was carried out in the same manner as in Example 1 except that in Example 1, the metallocene compound was changed to dimethylsilylene (cyclopentadienyl)(tetramethylcyclopentadienyl)zirconium dichloride, to obtain 1.06 g of an ethylene/dicyclopentadiene copolymer. The catalytic activity was 11.7 kg polymer/g-Zr, and the content of the dicyclopentadiene component in the copolymer was 29.9 mol %. As compared with Example 1, the catalytic activity and the dicyclopentadiene content were low. Further, Mw and Mw/Mn by the GPC measurement were 49,000 and 6.1, respectively, and the molecular weight distribution of the copolymer was very wide.

COMPARATIVE EXAMPLE 3

A copolymerization reaction was carried out in the same manner as in Example 1 except that in Example 1, the metallocene compound was changed to isopropylidenebiscyclopentadienylzirconium dichloride to obtain 0.51 g of an ethylene/dicyclopentadiene copolymer. The catalytic activity was 5.6 kg polymer/g-Zr, and the content of the dicyclopentadiene component in the copolymer was 49.1 mol %. As compared with Example 1, the content of the dicyclopentadiene was high at a level of Example 1, but the catalytic activity was very low.

COMPARATIVE EXAMPLE 4

A copolymerization reaction was carried out in the same manner as in Example 1 except that in Example 1, the metallocene compound was changed to isopropylidene (cyclopentadienyl)(fluorenyl)zirconium dichloride, but only a trace amount of an ethylene/dicyclopentadiene copolymer was obtained.

COMPARATIVE EXAMPLE 5

A copolymerization reaction was carried out in the same manner as in Example 1 except that in Example 1, the metallocene compound was changed to methylenebiscyclopentadienyl zirconium dichloride to obtain 0.15 g of an ethylene/dicyclopentadiene copolymer. The catalytic activity was 1.6 kg polymer/g-Zr, and the content of the dicyclopentadiene component in the copolymer was 48.1 mol %. As compared with Example 1, the content of the dicyclopentadiene was high at the level of Example 1, but the catalytic activity was very low.

EXAMPLE 2

A copolymerization reaction was carried out in the same manner as in Example 1 except that in Example 1, the charge of toluene as the solvent was changed to 40 ml, and the charge of dicyclopentadiene was changed to 40 g (300 mmol). Post-treatment was carried out in the same manner as in Example 1, to obtain 4.24 g of an ethylene/dicyclopentadiene copolymer. The catalytic activity was 46.5 kg polymer/g-Zr, and the content of the dicyclopentadiene component in the copolymer was as high as 52.7 mol %. Further, Mw and Mw/Mn by the GPC measurement were 235,000 and 1.8, respectively.

COMPARATIVE EXAMPLE 6

A copolymerization reaction was carried out in the same manner as in Example 2 except that in Example 2, the metallocene compound was changed to ethylenebisindenyl zirconium dichloride. 1.13 g of an ethylene/dicyclopentadiene copolymer was obtained, the catalytic activity was 12.4 kg polymer/g-Zr, and the content of the dicyclopentadiene component in the copolymer was 40.9 mol %. As compared with Example 2, the catalytic activity and the dicyclopentadiene content were low.

EXAMPLE 3

A copolymerization reaction was carried out in the same manner as in Example 1 except that in Example 1, the charge of toluene as the solvent was changed to 20 ml, and the charge of dicyclopentadiene was changed to 80 g (600 mmol). Post-treatment was carried out in the same manner as in Example 1, to obtain 2.08 g of an ethylene/dicyclopentadiene copolymer. The catalytic activity was 22.7 kg polymer/g-Zr, and the content of the dicyclopentadiene component in the copolymer was as high as 59.0 mol %. Further, Mw and Mw/Mn by the GPC measurement were 92,000 and 1.9, respectively.

COMPARATIVE EXAMPLE 7

A copolymerization reaction was carried out in the same manner as in Example 3 except that in Example 3, the metallocene compound was changed to ethylenebisindenyl zirconium dichloride. 0.48 g of an ethylene/dicyclopentadiene copolymer was obtained, the catalytic activity was 5.3 kg polymer/g-Zr, and the content of the dicyclopentadiene component in the copolymer was 49.5 mol %. As compared with Example 3, the catalytic activity and the dicyclopentadiene content were low.

EXAMPLE 4

A copolymerization reaction was carried out in the same manner as in Example 1 except that in Example 1, methylene(3-methylcyclopentadienyl)(tetramethylcyclopentadienyl) zirconium dichloride obtained in Reference Example 2 was used as the metallocene compound (A), to obtain 4.35 g of an ethylene/dicyclopentadiene copolymer. The catalytic activity was 47.7 kg polymer/g-Zr, and the content of the dicyclopentadiene component in the copolymer was as high as 48.6 mol %. Further, Mw and Mw/Mn by the GPC measurement were 177,000 and 2.4, respectively.

EXAMPLE 5

Into a 0.8 l autoclave flushed with nitrogen, 350 ml of dehydrated and purified toluene, 100 g (500 mmol) of tricyclopentadiene and 16.0 ml of a toluene solution of methylaluminoxane (MMAO, manufactured by Tosoh Akzo K.K., 1.87 mol/l as the concentration based on Al) were charged and stirred under heating to obtain a uniform solution of 60° C. Then, 5.0 $\mu$mol of a toluene solution of methylene(cyclopentadienyl)(tetramethylcyclopentadienyl) zirconium dichloride obtained in Reference Example 1, was added thereto, and stirring was continued for 30 minutes at 60° C. while maintaining an ethylene pressure of 0.294 MPa. After completion of the polymerization, the reaction mixture was put into hydrochloric acid/methanol, and a precipitated white solid was collected by filtration. The obtained white solid was washed with acetone and then dried under reduced pressure to obtain 10.0 g of an ethylene/tricyclopentadiene copolymer. The catalytic activity was 21.9 kg polymer/g-Zr, and the content of tricyclopentadiene component in this copolymer was as high as 38.1 mol %. Further, Mw and Mw/Mn by the GPC measurement were 67,000 and 1.9, respectively.

COMPARATIVE EXAMPLE 8

A copolymerization reaction was carried out in the same manner as in Example 5 except that in Example 5, the metallocene compound was changed to ethylenebisindenyl zirconium dichloride. 0.88 g of an ethylene/dicyclopentadiene copolymer was obtained, the catalytic activity was 1.93 kg polymer/g-Zr, and the content of the tricyclopentadiene component in the copolymer was 23.3 mol %. As compared with Example 5, the catalytic activity and the dicyclopentadiene content were low. Further, in the obtained copolymer, a gelled substance insoluble in a solvent, was observed.

EXAMPLE 6

A copolymerization reaction was carried out in the same manner as in Example 1 except that in Example 1, 20 g (150 mmol) of dicyclopentadiene was changed to 10 g (75 mmol) of dicyclopentadiene and 12 g (75 mmol) of 1,4,5,8-dimethano-1,2,3,4,4a,5,8,8a-octahydronaphthalene (hereinafter referred to simply as DMON), to obtain 3.56 g of an ethylene/dicyclopentadiene/DMON terpolymer. The catalytic activity was 39.0 kg polymer/g-Zr, the content of the dicyclopentadiene component and the content of the DMON component in the copolymer were as high as 34.5 mol % and 27.3 mol %, respectively. Further, Mw and Mw/Mn by the GPC measurement were 146,000 and 3.2, respectively.

EXAMPLE 7

A copolymerization reaction was carried out in the same manner as in Example 1 except that in Example 1, 20 g (150 mmol) of dicyclopentadiene was changed to 10 g (75 mmol) of dicyclopentadiene and 7 g (75 mmol) of 2-norbornene, to obtain 4.68 g of an ethylene/dicyclopentadiene/2-norbornene terpolymer. The catalytic activity was 51.4 kg polymer/g-Zr, and the content of the dicyclopentadiene component and the content of the 2-norbornene component in the copolymer were as high as 25.7 mol % and 41.3 mol %, respectively. Further, Mw and Mw/Mn by the GPC measurement were 182,000 and 3.5, respectively.

As described in the foregoing, the present invention provides a method for producing an olefin type copolymer having a cyclic structure and a narrow molecular weight distribution, whereby a gelled polymer component will not be formed, the copolymerization efficiency of a cyclic polyene or a cyclic olefin is high, and the polymerization activity is excellent.

The entire disclosure of Japanese Patent Application No. 2000-343540 filed on Nov. 10, 2000 including specification, claims, drawings and summary are incorporated herein by reference in its entirety.

What is claimed is:

1. A method for producing an olefinic copolymer, comprising:
copolymerizing a) ethylene (M1) and b) dicyclopentadiene or tricyclopentadiene (M2), and, optionally c) a cyclic olefin (M3), in the presence of a catalyst which comprises
a metallocene compound (A) of the following formula [1]:

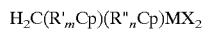  [1]

$H_2C(R'_mCp)(R''_nCp)MX_2$ wherein
M is zirconium or hafnium,
Cp is a group having a cyclopentadienyl skeleton,
each of R' and R" is a hydrocarbon group having 1 to 10 carbon atoms,
each of two X's which may be the same or different from each other, is a halogen atom, a hydrogen atom, a hydrocarbon group having 1 to 20 carbon atoms, a halogenated hydrocarbon group, an alkylamino group, an alkoxy group, an aryloxy group of the formula —O—Ar—$Y_p$, a thioalkyl group, or a thioaryl group of the formula —S—Ar—$Y_p$;
wherein in —O—Ar—$Y_p$ and in —S—Ar—$Y_p$, Ar is an aromatic ring, Y is a halogen atom, a hydrogen atom, a hydrocarbon group having 1 to 20 carbon atoms, a halogenated hydrocarbon group, an alkoxy group, an alkylamino group, a cyano group or a nitro group, and p is an integer of from 1 to 5, and
each of m and n is an integer of from 0 to 4,
provided that m and n are not equal, and m+n is an integer of from 3 to 6, and an aluminoxane (B), is used;
wherein said olefin copolymer has a cyclic structure.

2. The method according to claim 1, wherein said cyclic olefin (M3) is a compound of the formula [2]:

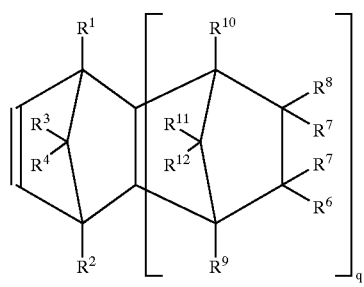  [2]

wherein
each of $R^1$ to $R^{12}$ is a substituent selected from the group consisting of a hydrogen atom, a halogen atom and a hydrocarbon group having 1 to 20 carbon atoms,
provided that $R^5$ and $R^7$ may form a ring together with the carbon atoms to which they are bonded, and q is an integer of at least 0.

3. The method according to claim 1, wherein in said olefinic copolymer having a cyclic structure, units derived from ethylene (M1) are within a range of from 5 to 99 mol %, units derived from dicyclopentadiene or tricyclopentadiene (M2) are within a range of from 1 to 95 mol %, and units derived from a cyclic olefin (M3) as optionally introduced, are within a range of from 0 to 90 mol %, and Mw/Mn is from 1.5 to 4.5.

4. The method according to claim 1, wherein said cyclic olefin (M3) is selected from the group consisting of 2-norbornene, 1,4,5,8-dimethano-1,2,3,4,4a,5,8,8a-octahydronaphthalene, 5-methyl-2-norbornene, 5-ethyl-2-norbornene, 5-propyl-2-norbornene, 5-phenyl-2-norbornene, 5-benzyl-2-norbornene, 5-ethylidene-2-norbornene, 5-vinyl-2-norbornene, 5-chloro-2-norbornene, 5-fluoro-2-norbornene, 5-chloromethyl-2-norbornene, 5-methoxy-2-norbornene, 7-methyl-2-norbornene, 5-isobutyl-2-norbornene, 5,6-dimethyl-2-norbornene, 5,5-dichloro-2-norbornene, 5,5,6-trimethyl-2-norbornene, 5,5,6-trifluoro-6-trifluoromethylnorbornene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene and 2,3-dimethyl-1,4,5,8-dimethano-1,2,3,4,4a,5,8,8a-octahydronaphthalene.

5. (New) The method according to claim 1, wherein said metallocene compound (A) is selected from the group consisting of methylene(cyclopentadienyl)(tetramethylcyclopentadienyl) zirconium dichloride, methylene(2-methylcyclopentadienyl)(tetramethylcyclopentadienyl) zirconium dichloride, methylene(3-methylcyclopentadienyl)(tetramethylcyclopentadienyl)zirconium dichloride, methylene(cyclopentadienyl)(2,3,5-trimethylcyclopentadienyl)zirconium dichloride, methylene (cyclopentadienyl)(2,3,4-trimethylcyclopentadienyl) zirconium dichloride, methylene(2-methylcyclopentadienyl)(2,3,4-trimethylcyclopentadienyl) zirconium dichloride, methylene(3-methylcyclopentadienyl)(2,3,5-trimethylcyclopentadienyl) zirconium dichloride, methylene(2-methylcyclopentadienyl)(2,3-dimethylcyclopentadienyl) zirconium dichloride, methylene(3-methylcyclopentadienyl)(2,4,-dimethylcyclopentadienyl) zirconium dichloride, methylene(2-methylcyclopentadienyl)(2,5-dimethylcyclopentadienyl) zirconium dichloride, methylene(2-methylcyclopentadienyl)(2,3,5-trimethylcyclopentadienyl) zirconium dichloride, methylene(3-methylcyclopentadienyl)(2,3,4-trimethylcyclopentadienyl) zirconium dichloride, methylene(2-methylcyclopentadienyl)(2,4-dimethylcyclopentadienyl) zirconium dichloride, methylene(2-methylcyclopentadienyl)(3,4-dimethylcyclopentadienyl) zirconium dichloride, methylene(3-methylcyclopentadienyl)(2,3-dimethylcyclopentadienyl) zirconium dichloride, methylene(3-methylcyclopentadienyl)(2,5-dimethylcyclopentadienyl) zirconium dichloride, methylene(3-methylcyclopentadienyl)(3,4-dimethylcyclopentadienyl) zirconium dichloride, methylene(2,3-dimethylcyclopentadienyl)(2,3,5-trimethylcyclopentadienyl)zirconium dichloride, methylene (2,4-dimethylcyclopentadienyl)(2,3,5-trimethylcyclopentadienyl)zirconium dichloride, methylene (2,3-dimethylcyclopentadienyl)(2,3,4-trimethylcyclopentadienyl)zirconium dichloride, methylene (2,3-dimethylcyclopentadienyl)(tetramethylcyclopentadienyl)zirconium dichloride, methylene(2,4-dimethylcyclopentadienyl) (tetramethylcyclopentadienyl)zirconium dichloride, methylene(2,5-dimethylcyclopentadienyl) (tetramethylcyclopentadienyl)zirconium dichloride, methylene(3,4-dimethylcyclopentadienyl) (tetramethylcyclopentadienyl)zirconium dichloride, methylene(2,4-dimethylcyclopentadienyl)(2,3,4-trimethylcyclopentadienyl)zirconium dichloride, methylene (2,5-dimethylcyclopentadienyl)(2,3,4- trimethylcyclopentadienyl)zirconium dichloride, methylene (2,5-dimethylcyclopentadienyl)(2,3,5-trimethylcyclopentadienyl)zirconium dichloride, methylene (3,4-dimethylcyclopentadienyl)(2,3,4-trimethylcyclopentadienyl)zirconium dichloride, methylene (3,4-dimethylcyclopentadienyl)(2,3,5-trimethylcyclopentadienyl)zirconium dichloride, methylene (3-ethylcyclopentadienyl) (tetramethylcyclopentadienyl) zirconium dichloride, methylene(cyclopentadienyl) (tetramethylcyclopentadienyl) bis(2-fluorophenoxy) zirconium, methylene(3-methylcyclopentadienyl) (tetramethylcyclopentadienyl)bis(2-fluorophenoxy) zirconium, methylene(cyclopentadienyl) (tetramethylcyclopentadienyl) zirconium dimethyl, methylene(cyclopentadienyl)(tetramethylcyclopentadienyl) zirconium diphenyl, methylene(cyclopentadienyl) (tetramethylcyclopentadienyl) bis(2-trifluoromethylphenoxy)zirconium, methylene (cyclopentadienyl)(tetramethylcyclopentadienyl) bis(2-methyl,4-fluorophenoxy)zirconium, methylene (cyclopentadienyl)(tetramethylcyclopentadienyl) zirconium dimethoxide, methylene(cyclopentadienyl) (tetramethylcyclopentadienyl) zirconium diphenoxide, methylene(3-methylcyclopentadienyl) (tetramethylcyclopentadienyl) zirconium dithiophenoxide, methylene(3-methylcyclopentadienyl) (tetramethylcyclopentadienyl)bis(4-cyanophenoxy) zirconium, and methylene(2-n-butylcyclopentadienyl) (tetramethylcyclopentadienyl)bis(2-trifluoromethylphenoxy)zirconium.

6. The method according to claim 1, wherein said aluminoxane (B) is represented by the following formula [3]:

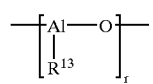

[3]

wherein
R$^{13}$ is an alkyl group having 1 to 8 carbon atoms, and r is a number of from 4 to 100.

7. The method according to claim 6, wherein said aluminoxane of the formula [3] is a methylaluminoxane.

8. The method according to claim 1, wherein said metallocene compound (A), said component (B) or both are supported on a carrier.

9. The method according to claim 8, wherein said carrier is an inorganic compound selected from the group consisting of silica, alumina and magnesium chloride.

10. The method according to claim 9, wherein said carrier is an organic polymer compound selected from the group consisting of polyethylene and polypropylene.

11. The method according to claim 1, wherein said metallocene compound (A) is used in an amount of from $10^{-6}$ to 1 g atom/l as a concentration of the transition metal.

12. The method according to claim 1, wherein said aluminoxane (B) is used in an amount of from $10^{-4}$ to 10 g atom/l as a concentration of aluminum atoms.

13. The method according to claim 1, wherein a ratio of the aluminoxane (B) to the metallocene compound (A) is from 1 to $10^7$ as a ratio of aluminum atoms in the aluminoxane (B) per mol of the metallocene compound (A).

14. The method according to claim 1, wherein said copolymerizing proceeds as a gas phase polymerization, a bulk polymerization, a solution polymerization or a slurry polymerization.

15. The method according to claim 1, wherein an inert hydrocarbon solvent is used during said copolymerizing.

16. The method according to claim 1, wherein dicyclopentadiene, tricyclopentadiene or said cyclic olefin are used as the solvent.

17. The method according to claim 1, wherein said copolymerizing proceeds at a temperature of from −100 to 250° C.

18. The method according to claim 1, wherein said copolymerizing proceeds at a pressure of at most 10 MPa.

19. The method according to claim 1, wherein said olefinic copolymer having a cyclic structure is substantially linear and has no gelled crosslinking structure.

20. The method according to claim 1, wherein said olefinic copolymer having a cyclic structure has a weight average molecular weight Mw measured by gel permeation chromatography within a range of from 500 to 2,000,000, and a number average molecular weight Mn of from 300 to 1,000,000.

* * * * *